May 6, 1930.  W. B. ALCORN  1,757,229
METHOD OF MAKING BRICKS
Filed July 2, 1928   2 Sheets-Sheet 1

INVENTOR
William B. Alcorn
BY
Swan, Frye, & Murray
ATTORNEYS

May 6, 1930.  W. B. ALCORN  1,757,229
METHOD OF MAKING BRICKS
Filed July 2, 1928  2 Sheets-Sheet 2
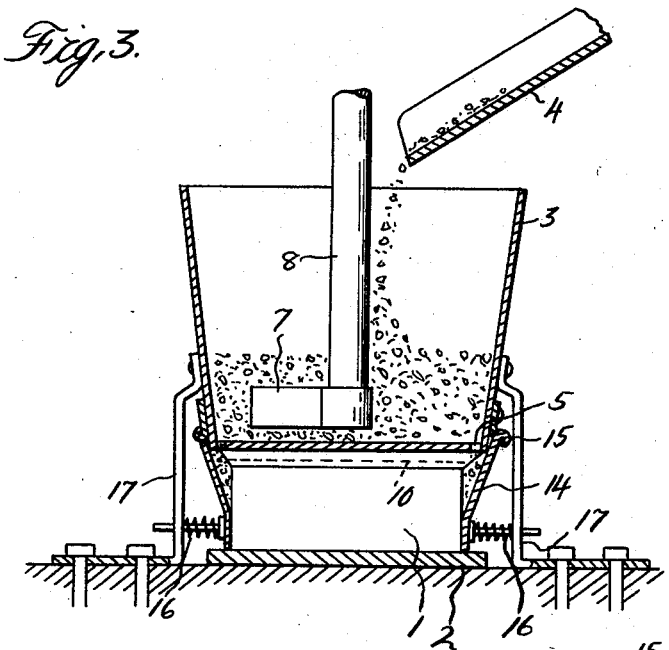
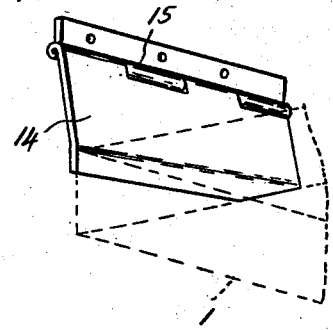
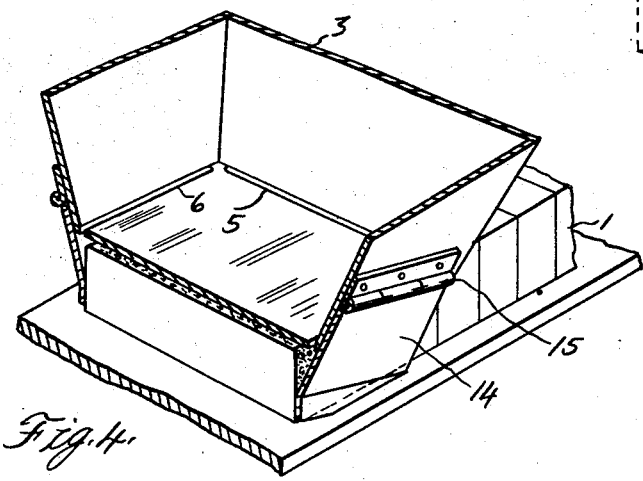
INVENTOR
William B. Alcorn
BY
Swan, Frye & Murray
ATTORNEYS Patented May 6, 1930

1,757,229

UNITED STATES PATENT OFFICE

WILLIAM B. ALCORN, OF DETROIT, MICHIGAN

METHOD OF MAKING BRICKS

Application filed July 2, 1928. Serial No. 289,648.

This invention relates to brick-making apparatus and to methods of making brick.

An object of the invention is to produce bricks of a more or less rough texture by an improved and relatively inexpensive method that will avoid mechanical uniformity in the resulting texture of the bricks and permit a ready control of the degree of roughness.

A more specific object of the invention is to impart an uneven and irregular texture to one or more faces of a brick or similar building element, by pressing or otherwise imbedding in one or more faces of said brick or element particles or granules of some combustible material as coal or saw-dust, and to utilize the heat to which the brick is subjected in its subsequent burning to destroy said particles thereby leave a pitted and uneven surface.

A further object of the invention is to provide a suitable apparatus for effecting a substantially uniform distribution of particles of combustible material to a one or more faces of a row of bricks, or a bar of clay while the same is in a plastic state.

These and various other objects the invention attains by the construction hereinafter described and illustrated in the accompanying drawings, wherein:

Fig. 3 is a cross-sectional view of the same taken upon the line 3—3 of Fig. 1.

Fig. 4 is a sectional perspective view of said apparatus.

Fig. 5 is a perspective detail view of a presser plate which is employed in said apparatus to distribute and imbed the combustible particles in a vertical face of the unburnt bricks or of the clay bar from which said bricks are to be cut.

Figure 1:
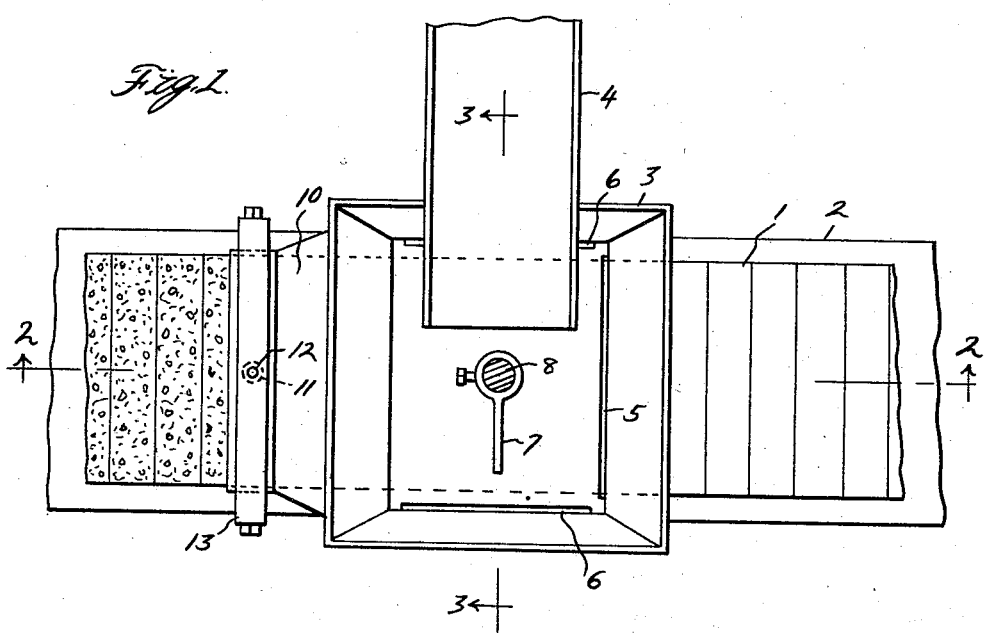
Fig. 1 is a plan view of one form of apparatus that may be employed in carrying out the herein disclosed method.

In these views, the reference character 1 designates an elongated rectangular bar of plastic clay which may or may not have been cut transversely to divide it into a series of bricks. Said bar rests upon a table or belt 2 and is adapted to be gradually advanced longitudinally by the application of pressure to an end of said bar or by a travel of the support 2. The formation of such a bar, the cutting of the same into bricks and the gradual advance of the same upon or with a suitable support are all characteristic of the present practice in making bricks.

In carrying out the present invention, a hopper 3 or the like is disposed above the bar 1 for the purpose of distributing particles of coal, saw-dust or other combustible material upon said bar. As illustrated, such material is adapted to be supplied to said hopper by way of a chute 4 and the hopper bottom is formed with a transversely elongated slot 5 for discharging material upon the top face of the bar 1 and with a pair of spaced slots 6, adjacent and parallel to the hopper side walls for distributing such material into contact with the respective side faces of said bar, preferably, an agitator arm 7, carried by the lower end of a suitable vertical shaft 8, is rotatable adjacent to the bottom of said hopper to insure a substantially uniform flow of the material through the slots 5 and 6. The material discharges from the slot 5 in a narrow stream which is continuous across the entire face of the bar 1 and which owing to the uniform longitudinal advance of said bar effects an approximately uniform distribution of the material to the entire top surface of said bar. Upon the front wall of the hopper is exteriorly hinged at 9 a presser plate 10, which extends forwardly and inclines downwardly at an acute angle to the bar 1, having its end portion bent to rest flat upon the top face of said bar throughout the width of the latter for pressing into said face the particles previously delivered thereupon. The necessary pressure is applied to the bearing portion of said plate by a coiled spring 11 retained in place above the said plate by a rod 12 secured to said plate and slidable in a guide member 13, arched to straddle the bar 1. Said spring is suitably compressed between the plate and top portion of the member 13.

Figure 2:
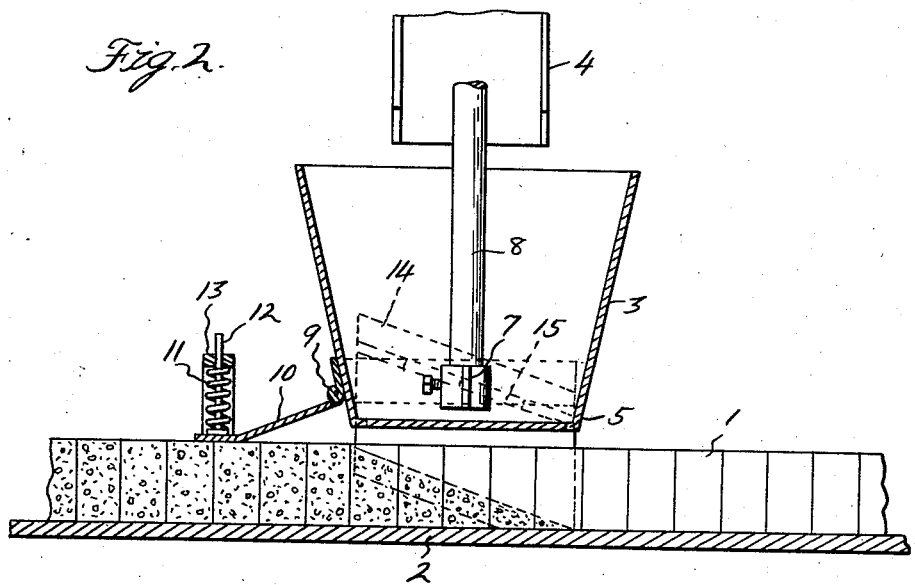
Fig. 2 is a view of the same in side elevation and partly in section, taken on line 2—2 of Fig. 1.

The material discharging from the two lateral slots 6 is distributed upon the side faces of the bar 1 by a pair of sheet metal presser plates 14, hinged to the side faces of the hopper 3 as indicated at 15. As said plates extend downwardly they are inclined at acute angles to the side faces of said bar, their lower edge portions being bent to form bearing portions in contact with and parallel to said side faces, said portions being inclined gradually lengthwise of the bar as best disclosed in Figs. 2 and 5. Owing to the gradual inclination of the bearing portions of the plates 14, the streams of material that descend from the hopper 3 throughout the lengths of the slots 6 encounter said portions throughout their inclined length so that said material as it is carried past said portions is distributed substantially uniformly throughout the height of the bar 1, so as to be imbedded uniformly in both side faces of the bar. A proper degree of pressure is applied to the bearing portions of the plates 14 by coiled springs 16 compressed between said portions and a pair of bracket arms 17 mounted fast upon the side faces of the hopper 3 and depending therefrom.

Thus it is seen that the hopper 3 with the three pressure plates hinged thereupon forms a unit for distributing the combustible particles with approximate uniformity to the top and side faces of the clay bar and for pressing said particles into said bar flush with said faces.

It will be understood that the combustible particles which are fed to the bar 1 are not uniform in size or shape so that there is no such uniformity in the resulting pockets or pits as to suggest a mechanical effect.

It is to be understood that the described apparatus merely exemplifies one possible means for carrying out the disclosed method and that numerous other provisions are readily conceivable for effecting a substantially uniform distribution of combustible particles to one or more faces of a series of bricks in plastic form or to the bar from which said bricks are to be cut.

What I claim is:

1. The method of imparting a rough texture to bricks consisting in gradually advancing a clay bar proportioned for the cutting of bricks therefrom, imbedding particles of a combustible material in a top face and side faces of said bar, in the course of its advance, and burning out said particles, through the burning of the bricks formed from said bar to impart a pitted appearance to the surface to which said particles were applied.

2. The method of imparting a rough texture to bricks consisting in gradually advancing a clay bar proportioned for the cutting of bricks therefrom, distributing particles of combustible material upon a surface of said bar in the course of its advance, pressing said particles into such surface to a substantially flush relation therewith through the advance of said bar, and burning out said particles.

3. The method of imparting a rough texture to bricks consisting in longitudinally advancing a clay bar from which the bricks are to be cut, distributing particles of a combustible material to a top face and to the sides of said bar in the course of its advance, applying pressure to said particles through a further advance of said bar, to imbed them in said faces of the bar, and subsequently burning out said particles to secure a pitted effect upon the faces to which said particles were applied.

4. The method of imparting a rough texture to a brick consisting in distributing particles of combustible material substantially uniformly upon a surface of the brick in its original soft condition, pressing said particles into said surface to a substantially flush relation therewith and burning out said particles, as the brick is being burnt.

In testimony whereof I sign this specification.

WILLIAM B. ALCORN.